United States Patent
Zhu et al.

(10) Patent No.: US 10,872,204 B2
(45) Date of Patent: Dec. 22, 2020

(54) GENERATING NATURAL LANGUAGE RECOMMENDATIONS BASED ON AN INDUSTRIAL LANGUAGE MODEL

(71) Applicant: GE Inspection Technologies, LP, Lewistown, PA (US)

(72) Inventors: Xuan Zhu, San Ramon, CA (US); Arun Karthi Subramaniyan, Danville, CA (US); Haiming Zhao, San Ramon, CA (US); Zhengjie Xu, Dublin, CA (US)

( * ) Notice: Subject to any disclaimer, the term of this patent is extended or adjusted under 35 U.S.C. 154(b) by 126 days.

(21) Appl. No.: 16/256,316

(22) Filed: Jan. 24, 2019

(65) Prior Publication Data

US 2019/0236132 A1 Aug. 1, 2019

Related U.S. Application Data

(60) Provisional application No. 62/622,693, filed on Jan. 26, 2018.

(51) Int. Cl.
*G06F 40/284* (2020.01)
*G06N 20/00* (2019.01)
*G06F 40/30* (2020.01)

(52) U.S. Cl.
CPC ............ *G06F 40/284* (2020.01); *G06F 40/30* (2020.01); *G06N 20/00* (2019.01)

(58) Field of Classification Search
CPC ........ G06F 40/284; G06F 40/30; G06F 40/40; G06N 20/00
USPC .......................................................... 704/9
See application file for complete search history.

(56) References Cited

U.S. PATENT DOCUMENTS

| | | | | |
|---|---|---|---|---|
| 7,970,721 | B2* | 6/2011 | Leskovec | G06F 16/951 |
| | | | | 706/46 |
| 8,713,025 | B2* | 4/2014 | Eder | G06F 16/951 |
| | | | | 707/741 |
| 9,092,425 | B2* | 7/2015 | Mirowski | G06F 40/40 |
| 9,361,290 | B2* | 6/2016 | Bruss | G06F 40/242 |
| 9,535,902 | B1* | 1/2017 | Michalak | G06F 40/30 |
| 9,818,401 | B2* | 11/2017 | Printz | G10L 15/32 |
| 10,109,017 | B2* | 10/2018 | Bothwell | G06N 20/00 |
| 10,170,114 | B2* | 1/2019 | Printz | G06F 40/295 |
| 10,198,431 | B2* | 2/2019 | Somasundaran | G06F 40/284 |
| 10,249,298 | B2* | 4/2019 | Stajner | G10L 15/22 |
| 10,311,442 | B1* | 6/2019 | Lancaster | G06N 5/04 |
| 10,380,490 | B1* | 8/2019 | Somasundaran | G06N 5/048 |
| 10,515,153 | B2* | 12/2019 | Heilman | G06F 40/30 |
| 10,558,738 | B1* | 2/2020 | Strimel | G06N 7/005 |
| 10,593,346 | B2* | 3/2020 | Van Gysel | G10L 15/16 |
| 10,599,885 | B2* | 3/2020 | Galitsky | G06F 40/216 |

* cited by examiner

*Primary Examiner* — Susan I McFadden
(74) *Attorney, Agent, or Firm* — Mintz Levin Cohn Ferris Glovsky and Popeo, PC; Lisa Adams

(57) ABSTRACT

Systems, methods, and a computer readable medium are provided for generating natural language recommendations based on an industrial language model. Input data, including a plurality of natural language input units is received from a first computing device and transmitted to a second computing device. The second computing device can determine an output including a plurality of natural language outputs using a predictive model trained to generate the output corresponding to an energy exploration lexicon. The second computing device can provide the output to the first computing device for display.

25 Claims, 6 Drawing Sheets

GENERATING NATURAL LANGUAGE RECOMMENDATIONS BASED ON AN INDUSTRIAL LANGUAGE MODEL

CROSS-REFERENCE TO RELATED APPLICATIONS

The present application claims priority under 35 U.S.C. § 119 to U.S. Provisional Application No. 62/622,693 entitled "Generating Natural Language Recommendations Based on an Industrial Language Model" filed on Jan. 26, 2018, which is hereby expressly incorporated by reference in its entirety.

BACKGROUND

Natural language includes letters, words, sentences, phrases or combinations thereof that are utilized by humans to communicate about topics, objects, tasks, or an environment. Domain-specific natural language includes a subset of natural language letters, words, sentences, phrases or combinations thereof that are utilized by humans to describe topics, objects, tasks, or an environment in the context of a particular domain or industry, such as the oil and gas domain or the energy exploration industry.

Users providing inputs to domain-specific applications may have limited knowledge of domain-specific natural language that can be used when providing the inputs. As a result, the applications may provide outputs that are not contextually relevant with respect to a particular input or task that a user is attempting to perform, but may be weakly correlated to the received inputs. Such limitations can reduce knowledge transfer, task completion and communication quality for users interacting with the applications.

Machine learning is an application of artificial intelligence that automates the development of an analytical model by using algorithms that iteratively learn patterns from data without explicit indication of the data patterns. Machine learning is commonly used in pattern recognition, computer vision, language processing and optical character recognition and enables the construction of algorithms that can accurately learn from data to predict model outputs thereby making data-driven predictions or decisions. Machine learning can be utilized to develop an industrial language model capable of generating domain-specific natural language that is associated with a particular industry or domain.

SUMMARY

In one aspect, methods for generating natural language recommendations based on an industrial language model are provided. In one embodiment, the method can include receiving an input provided to a first computing device, including a data processor. The input including a plurality of natural language input units. The method can further include transmitting the input to a second computing device including a data processor. The transmission performed by the first computing device over a network. The method can also include determining an output, by the second computing device. The output determined using the transmitted input and a predictive model trained to receive natural language input units and, in response to the receiving, generate an output corresponding to an energy exploration lexicon. The output including a plurality of natural language output units predicted to correspond to the input and included in the energy exploration lexicon. The method can further include transmitting the output, by the second computing device, to the first computing device. The transmission causing the first computing device to provide the output for display.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
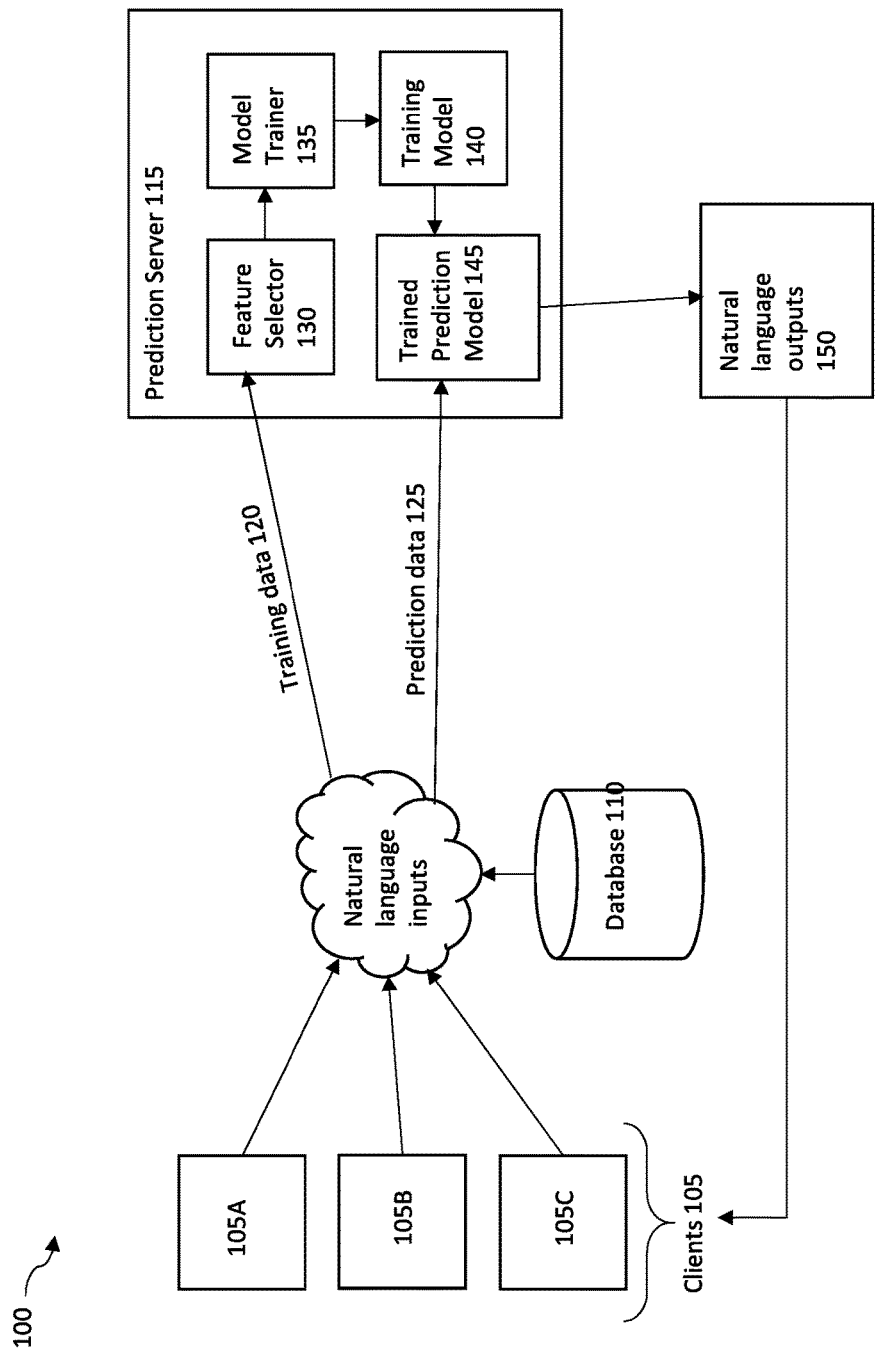
FIG. 1 is a block diagram illustrating an example architecture for generating natural language recommendations based on an industrial language model.

It is noted that the drawings are not necessarily to scale. The drawings are intended to depict only typical aspects of the subject matter disclosed herein, and therefore should not be considered as limiting the scope of the disclosure.

DETAILED DESCRIPTION

Providing recommendations of domain-specific natural language can be an important objective for organizations seeking to ensure written and verbal communications include natural language units, such as words, that may be contextually accurate with respect to the nature of the communication being performed as well as the particular industry or domain in which the organization operates. Use of domain-specific words or phrases in product documentation, training, and marketing materials, as well as technical data, application outputs, and search results, can greatly enhance the quality and interpretability of the materials or application outputs. In some cases, domain-specific language may be required for a subsequent processing step or as part of an interim deliverable in a domain-specific workflow that cannot be completed as required unless the appropriate domain-specific language is provided by the user. However, some users, especially novice users who may have limited experience in a particular domain may be unable to self-generate the necessary domain-specific language.

New or non-expert users of domain-specific software applications can similarly often lack the awareness or knowledge of domain-specific natural language to use when providing inputs to the applications. Domain-specific experts often communicate using natural language that is contextually relevant to the particular industry or domain in which they work and can provide application inputs using the domain-specific natural language they have acquired as experts in a particular field. However, non-expert users may not be aware of the full range of vocabulary of the domain-specific natural language and may provide application inputs that include less appropriate domain-specific natural language which can result in erroneous outputs, inefficient knowledge transfer, and can require additional processing and/or computing resources in order to generate outputs that include domain-specific natural language that is contextually related to the application inputs. For example, a user interacting with a chat-bot application or an automated recommendation agent may, upon providing inputs that lack enough domain-specific keywords, receive outputs or recommendations that can be unrelated to the domain-specific task or objective for which the user was seeking to gain knowledge. As a result, the user may discontinue interacting with the application, or may perform the domain-specific tasks or objectives without sufficient domain-specific knowledge.

In the oil and gas or energy exploration domain, a lexicon of domain-specific language may be used for communications between users or for communications with a computing device. Users can include engineers, technicians, geologists, petrophysicists, and petrochemical engineers. For example, users may be required to provide inputs to a domain-specific search engine used to determine specifications for operating equipment. A user may provide words or phrases intended to relate to the domain-specific operating equipment but which may lack the necessary domain-specific language for the search engine to process the inputs. As a result, the search engine may generate incorrect outputs or outputs that may not be related to the operating equipment. The consequence of such incorrect outputs can include misinformation or incorrect information, such as an incorrect specification for a piece of operating equipment that may be included in product documentation or communicated to another resource in a domain-specific workflow. In some situations, misinformation or inaccurate, industry-specific data may have minimal downstream effects, such as a typo in a product manual. In other situations, incorrect or less-specific industry information can produce catastrophic results, for example if an incorrect part number or specification detail is communicated or otherwise implemented in a mission critical workflow.

An industrial language model can be configured to interoperate with domain-specific software applications such that upon receiving natural language inputs to the applications, the inputs can be transmitted to the industrial language model and processed to determine natural language outputs that include words, sentences, and phrases found in a domain-specific lexicon, such as a lexicon that is associated with the oil and gas or energy exploration industry. The industrial language model may be further configured to, in response to receiving natural language inputs, embed new or missing words, classify categories or topics within the received inputs generate text to be included in the outputs, and rank the natural language outputs based on user preferences prior to providing the outputs.

Thus, systems and methods to automatically determine and generate recommendations providing industry-specific language based on inputs that do not include industry-specific language may significantly reduce operating errors when information is communicated within an organizations. In addition, an improved recommendation system, utilizing an industrial language model for example, would reduce computing resources necessary to process inaccurate inputs and would provide a more efficient means for users to acquire industry-specific recommendations and communicate using accurate domain-specific information that is contextually relevant to a particular object, task, process, or data element than conventional recommendation system that may not include a domain-specific industrial language model. Without an improved recommendation system as will be described further herein, substantial computing resources would be required to A domain-specific natural language recommendation system is provided herein including systems, methods, and computer-readable mediums for generating recommendations based on an industrial language model. The generated recommendations can facilitate dissemination of high-quality, domain-specific information between members of an organization and can provide a more robust learning experience for users interacting with one or more domain-specific application. For example, the recommendations can be generated in response to user input provided as queries to the domain-specific applications. Applications can be configured with auto-suggestion and auto-correction interfaces and can be further configured to provide outputs that include recommendations generated by the domain-specific natural language recommendation system described herein.

The domain-specific natural language recommendation system can receive natural language inputs, provided by users to a variety of application interfaces that can be configured on computing devices within a computing environment. The computing devices can transmit the inputs to other computing devices where, once received, they can be processed using a predictive model that has been trained in a machine learning process to generate natural language outputs that include words, parts of words, characters, numbers, or sequences thereof which the model has determined possess a strong contextual and domain-specific correlation to the received inputs. The outputs can be further transmitted back to the computing devices at which the inputs were received where they can be provided or displayed to the user.

Users may receive the domain-specific, natural language outputs in relation to providing natural language inputs to applications that can include auto-suggestion, auto-correction, translation, and interactive agents, such as chatbots. The domain-specific natural language system described herein may also be used to provide images as the inputs, in addition to or separately from the natural language inputs. In these situations, the predictive model can generate outputs of natural language as annotations or tags of an image. In these ways, a large variety of inputs can be received and used to determine domain-specific, natural language outputs. The natural language outputs can enhance communications between users and ensure that specific formats of domain-specific information can be disseminated within an organization. In addition, the natural language outputs can reduce errors or inaccuracies by providing the outputs as results that include domain-specific language which can be used to aid document and/or text generation and automated report generation. By automating tedious and sometimes subjective text generation tasks, the improved recommendation system can reduce human biases in decision making processes and provide domain-specific data in a more timely manner so that production and operation tasks can be completed more efficiently in an oil and gas production or exploration environment.

Embodiments of systems and corresponding methods for determining a route plan identifying assets from which additional condition monitoring data is to be collected are discussed herein. However, embodiments of the disclosure can be employed for determining a route plan identifying assets based on a variety of asset attributes without limit.

FIG. 1 is a block diagram illustrating an example architecture 100 for generating natural language recommendations based on an industrial language model. The architecture 100 includes clients 105, database 110, and server 115, which can be communicatively coupled over a network.

As shown in FIG. 1, the architecture 100 includes clients 105, e.g., clients 105A-105C. The clients 105 can include a large-format computing devices or any other fully functional computing device, such as a desktop computers or laptop computers, can transmit user data to prediction server 115. Additionally, or alternatively, other computing devices, such as a small-format computing devices 105 can also transmit user data to the prediction server 115. Small-format computing devices 105 can include a tablet, smartphone, personal digital assistant (PDA), or any other computing device that can have more limited functionality compared to large-format computing devices. For example, client 105A can include a laptop configured with a web-browser to display a sensor management application configured with respect to a number sensors that can be deployed on wells in an oil field. Client 105B can include a desktop computer configured with an interactive agent that is integrated with a database containing well pump specification data. Client 105C can include a smart phone configured with an application to generate reports or product data sheets in response to user search queries and other textual or visual inputs. The clients 105 can also include memory storing input and output data that may be provided to one or more domain-specific applications that may also be stored in the memory on the client 105.

The architecture 100 also includes a database 110 that can store domain-specific data sets, documentation, textual data sources, and non-textual data sources, such as image libraries containing one or more images. In addition, user data associated with natural language inputs that users have provided to one or more applications that are configured on any of the clients 105 can be stored in the database 110. The database 110 can further store the natural language outputs that can be generated by the improved recommendation system described herein.

As further shown in FIG. 1, natural language inputs can be transmitted from the clients 105 and/or from the database 110 to the prediction server 115. In some embodiments, the natural language inputs includes training data 120 that is transmitted to the prediction server 115 for use in a machine learning process. The training data 120 is used to train a machine learning algorithm in a machine learning process in order to generate a training model capable of predicting recommendations that include domain-specific recommendations based on a wide variety of received natural language inputs. In some embodiments, the natural language inputs include prediction data 125 that is transmitted to a prediction server 115 as inputs to the generated model that was trained in the machine learning process using the training data 120.

The natural language inputs can include inputs that may be provided to a domain-specific application, such as a report generator or search interface. For example, the natural language inputs can include textual inputs to a variety of fields displayed in an interface of the domain-specific application. A user may enter words, numbers, sentences, or even whole documents as the natural language inputs. The natural language inputs provided as prediction data 125 may include language that has a weak or poor contextual relevance to the domain or industry in which the application and the improved recommendation system may be associated. A user may enter "gammar" to a field of an application. The improved recommendation system would be trained to identify this input as related in a contextual and domain-specific manner to "gamma" which may be a data processing component called a "gamma board" that is used within the particular industry or domain for which the predictive model has been trained. As a result, the improved recommendation system may perform a spelling correction to "gamma" and/or provide the user with a suggestion of "gamma board". Without the improved recommendation system, the input of "gammar" may be corrected to "grammar", which provides no contextual or domain-specific relevance to a user of the application.

As shown in FIG. 1, the architecture 100 includes a prediction server 115 configured to receive the natural language inputs and generate domain-specific natural language outputs 150 as recommendations in a variety of applications which may be configured on computing devices, such as clients 105, which can be coupled to the prediction server 115. In broad overview, the prediction server 115 functions in the training aspect of a machine learning process to receive natural language inputs and/or data stored in databased 110 as training input and generate a training model for use in predicting natural language outputs as domain-specific recommendations. The prediction server 115 includes a feature selector 130, which is used in the training aspect of the machine learning process to select subsets of features in the natural language inputs. The prediction server 115 also includes a model trainer 135 which uses a selected machine learning algorithm to process the selected subsets of features and generate a new training model 140 which can be subsequently used outside of the machine learning process to predict natural language outputs that include domain-specific recommendations based on the received the prediction data 125.

As shown in FIG. 1, the prediction server 115 includes a feature selector 130. During the training aspect of the machine learning process, the feature selector 130 receives natural language inputs and selects subsets of features in the natural language inputs which are used as training input to train the selected machine learning algorithm. For each selected subset of features in the training input, the selected machine learning algorithm can be trained to predict natural language outputs that may be associated with the subset of features for which the selected machine learning algorithm was trained. The trained machine learning algorithm can then be output as a new trained model (e.g., training model 140), which can then be subsequently applied to natural language inputs (e.g., prediction data input 125) to determine natural language outputs that may be provided as domain-specific recommendations.

The prediction server 115 also includes a model trainer 135. In some embodiments, the model trainer 135 can be included in the prediction server 115. In other embodiments, the model trainer 135 can be located remotely from the prediction server 115. During the training aspect of the machine learning process, the model trainer 135 receives the training input including the selected subsets of features from the feature selector 130 and iteratively applies the subsets of features to the previously selected machine learning algorithm to assess the performance of the algorithm. As the machine learning algorithm processes the training input, the model trainer 135 learns patterns in the training input that map the machine learning algorithm variables to the target output data (e.g., the predicted natural language outputs) and generates a training model that captures these relationships. For example, as shown in FIG. 1, the model trainer 135 outputs the training model 140. As further shown in FIG. 1, the training model 140 that is output can be a trained prediction model 145.

As further shown in FIG. 1, the prediction server 115 includes a trained prediction model 145. The trained prediction model 145 is a model or algorithm that has been generated as a result of the model training performed during the training aspect of the machine learning process. Once trained, the trained prediction model 145 can operate outside of a machine learning process to receive user data as prediction data 125 and generate sequences of actions 150 for a given user in regard to a specific objective. For example, the trained prediction model 145 generates natural language outputs 150 that are optimized based on the natural language inputs that may be provided by client 105A in response to a user providing inputs and interacting with the sensor management application configured on client 105A.

Figure 2A:
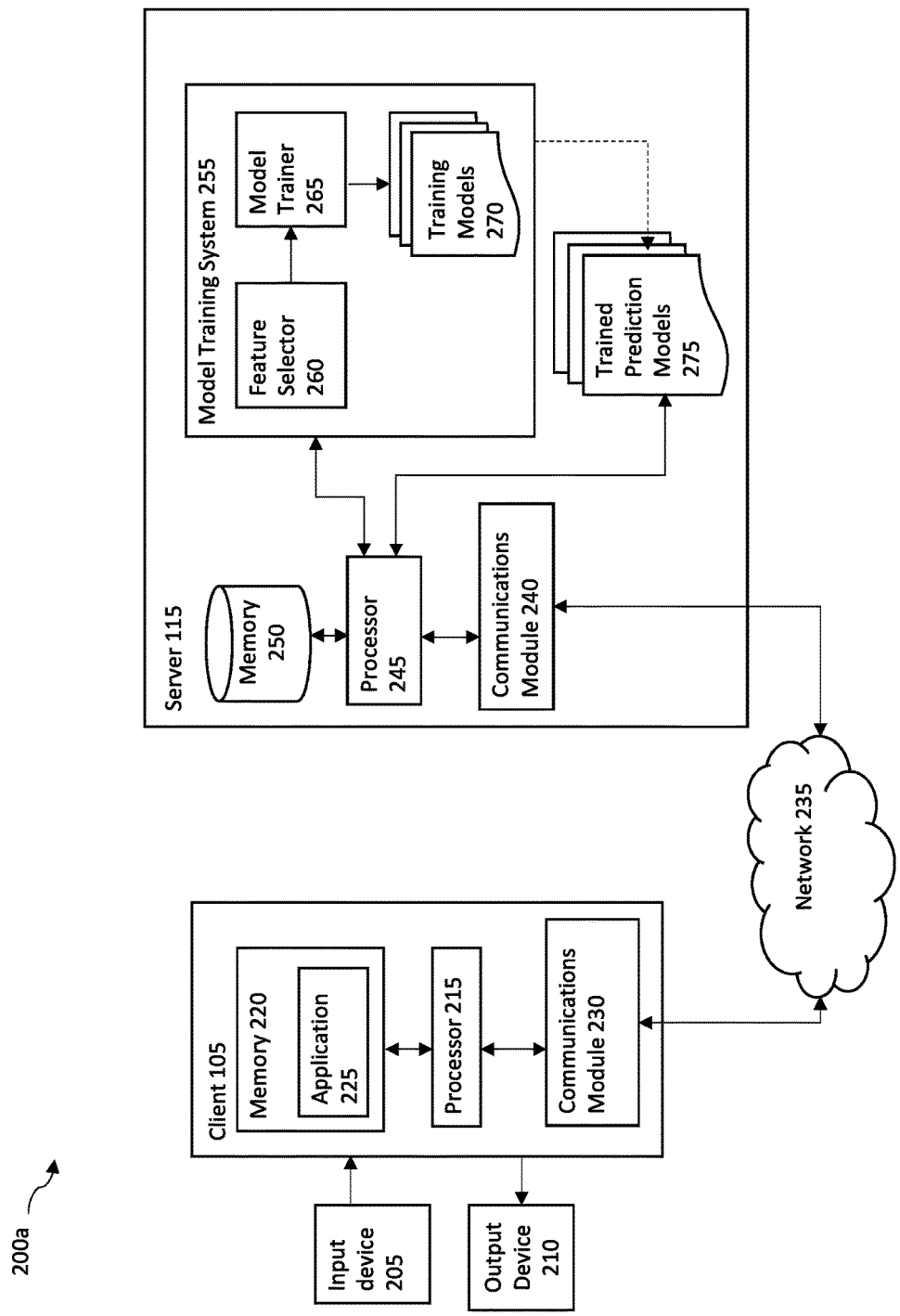
FIGS. 2A-2B illustrate example block diagrams of systems for generating natural language recommendations based on an industrial language model.

FIG. 2A is an example block diagram of a system 200a for predicting natural language outputs as domain-specific recommendations using machine learning according to some embodiments. System 200a includes an input device 205 and an output device 210 coupled to a client 105, such as any of the clients 105 described in relation to FIG. 1.

As shown in FIG. 2A, the client 105 includes a processor 215 and a memory 220 storing an application 225. The client 105 also includes a communications module 230 connected to network 235. System 200a also includes a server 115, such as the prediction server 115 described in relation to FIG. 1. The server 115 includes a communications module 240, a processor 245 and a memory 250. The server 115 also includes a model training system 255. The model training system 255 includes a feature selector 260, a model trainer 265 and one or more training models 270. The model training system 255 includes similar components and performs similar operations as the prediction server 115 shown in FIG. 1, except where indicated otherwise in the foregoing description. The server 115 also includes one or more trained prediction models 275, which are shown in dotted lines to indicate that the training models 270, that were output during the training performed in the machine learning process. The training models can be one or more trained prediction models, such as the one or more trained prediction models 275.

As shown in FIG. 2A, the system 200a includes an input device 205. The input device 205 receives user input and provides the user input to client 105. The input device 205 can include a keyboard, mouse, microphone, stylus, game controller, joy stick, hand/or any other device or mechanism used to input user data or commands to an application or user interface on a client, such as client 105. In some embodiments, the input device 205 can include haptic, tactile or voice recognition interfaces to receive the user input, such as on a small-format device. In some embodiments, the input device 205 can be an input device associated with a client 105 that is configured within a domain-specific computing environment. The domain-specific computing environment may include domain-specific software applications that may be configured receive inputs, such as natural language inputs, and generate outputs, such as natural language outputs.

The system 200a also includes a client 105. The client 105 communicates via the network 235 with the server 115. The client 105 receives input from the input device 205. The client 105 can be, for example, a large-format computing device, such as large-format computing device 105 as described in relation to FIG. 1, a small-format computing device (e.g., a smartphone or tablet), such as small-format computing device 105, or any other similar device having appropriate processor, memory, and communications capabilities to transmit a received user input. The client 105 can be configured to receive, transmit, and store natural language inputs associated with predicting recommendations including natural language outputs based on the natural language inputs received from client 105. The client 105 can be configured with one or more domain-specific software applications. The domain-specific applications can include web-based applications as well as applications that can be directly hosted or configured on the client 105. For example, the domain-specific software applications can include technical computing applications, modeling and simulation applications, search applications, asset management applications, as well as marketing, human resources, and inventory management applications. In some embodiments, the domain-specific applications can include applications configured to tag or annotate images using domain-specific natural language.

As further shown in FIG. 2A, the client 105 includes a processor 215 and a memory 220. The processor 215 operates to execute computer-readable instructions and/or data stored in memory 220 and transmit the computer-readable instructions and/or data via the communications module 230. The memory 2220 can store computer-readable instructions and/or data associated with predicting natural language outputs as domain-specific recommendations based on natural language inputs. For example, the memory 220 can include a database of natural language inputs received by the client 105, such as a database 110 as shown in FIG. 1. The memory 220 includes an application 225. The application 225 can be, for example, a domain-specific application configured to receive a natural language input for use in performing a sequence of actions associated with an objective to be completed using the application 225. The application 225 can generate outputs, including natural language outputs, which may be provided to the user as domain-specific recommendations. The recommendations can include natural language outputs including words, numbers, sequences, characters, or other natural language output that corresponds to the objective the user is attempting to perform using the applications 225. In some embodiments, the application 225 can receive natural language inputs for use in determining an output including a spelling correction or suggestion. In some embodiments, the application 225 can receive natural language inputs as input to an artificial computing entity, such as an interactive chatbot. In some embodiments, the applications 225 can receive the natural language inputs as inputs to a domain-specific search interface or a domain-specific text generation application or interface. The application 225 can include textual, graphical, or touch-based user interfaces to receive the natural language input for a sequence of actions to be completed for an objective.

As shown in FIG. 2A, the client 105 includes a communications module 230. The communications module 230 transmits the computer-readable instructions and/or the natural language inputs stored on or received by the client 105 via network 235. The network 235 connects the client 105 to the server 115. The network 235 can include, for example, any one or more of a personal area network (PAN), a local area network (LAN), a campus area network (CAN), a metropolitan area network (MAN), a wide area network (WAN), a broadband network (BBN), the Internet, and the like. Further, the network 235 can include, but is not limited to, any one or more of the following network topologies, including a bus network, a star network, a ring network, a mesh network, a star-bus network, tree or hierarchical network, and the like.

As further shown in FIG. 2A, the server 115 operates to receive, store and process the computer-readable instructions and/or the natural language inputs generated and received by client 105. In some embodiments, the server 115 can receive natural language inputs directly from one or more clients 105. The server 115 can be any device having an appropriate processor, memory, and communications capability for hosting a machine learning process. In certain aspects, one or more of the servers 115 can be located on-premises with client 105, or the server 115 can be located remotely from client 105, for example in a cloud computing facility or remote data center. The server 115 includes a communications module 240 to receive the computer-readable instructions and/or the natural language inputs transmitted via network 235. The server 115 also includes one or more processors 245 configured to execute instructions that when executed cause the processors to determine predicted natural language outputs as domain-specific recommendations based on the received natural language inputs. The server 115 also includes a memory 250 configured to store the computer-readable instructions and/or natural language inputs associated with predicting natural language outputs as domain-specific recommendations based on the received natural language inputs. In some embodiments, the memory 250 can store data which may be used in the training phase of the machine learning process. For example the memory 250 can store domain-specific datasets, such as datasets associated with the oil and gas domain. Additionally, or alternatively, the memory 250 can store domain-specific production data or customer data that has been received from customers. In some embodiments, memory 250 can store one or more training models, such as the training models 270 used during the training of a machine learning process to generate a trained prediction model 275 configured to generate predicted natural language outputs as recommendations of domain-specific information that is contextually related to the natural language inputs provided to application 225. In some embodiments, memory 250 can store one or more training models, such as trained prediction models 275 that were similarly generated during a machine learning process and were trained to generate predicted natural language outputs for different objectives associated with the domain-specific applications and the natural language inputs provided to the applications by a user. In some embodiments, the memory 250 can store one or more machine learning algorithms that will be used to generate one or more training models. In some embodiments, the memory 250 can store natural language inputs that may be received from client 105 over time and can be used as a training dataset in the machine learning process in order to train a prediction model. In some embodiments, the memory 250 can store one or more trained prediction models 275 that may be used to predict natural language outputs as domain-specific recommendations based on natural language inputs.

As shown in FIG. 2A, the server 115 includes a model training system 255. The model training system 255 functions in a machine learning process to receive natural language inputs as training input and processes the inputs to train one or more training models. The model training system 255 includes a feature selector 260, a model trainer 265, and one or more training models 270. In some embodiments, the training models 270 that are generated and output as a result of the machine learning process are configured on server 115 as standalone components on server 115. For example, the trained prediction models 275 are configured on server 115 to process the natural language inputs and generate a predicted natural language output as a domain-specific recommendations. In some embodiments, the trained prediction models 275 are stored in memory 250 on server 115.

The model training system 255 is configured to implement a machine learning process that receives natural language inputs as training input and generates a training model that can be subsequently used to predict natural language outputs as domain-specific recommendations based on natural language inputs that may be received by one or more domain-specific applications that may be configured on a client 105. The components of the machine learning process operate to receive natural language inputs as training input, select unique subsets of features within the natural language inputs, use a machine learning algorithm to train a model based on the subset of features in the training input and generate a training model that can be output and used for future predictions based on a variety of received natural language inputs.

As shown in FIG. 2A, the model training system 255 includes a feature selector 260. The feature selector 260 operates in the machine learning process to receive the natural language inputs and select a subset of features from the inputs which will be provided as training inputs to a machine learning algorithm. In some embodiments, the feature selector 260 can select a subset of features corresponding to different categories of the domain-specific applications or functionality that were used to receive the natural language inputs such that the machine learning algorithm will be trained to predict natural language outputs as domains-specific recommendations based on the selected subset of features. In some embodiments, the feature selector 260 can select a subset of features corresponding to the type of data provided as inputs to the domain-specific applications, such as features that may be related to textual inputs or image-based inputs.

During the machine learning process, the feature selector 260 provides the selected subset of features to the model trainer 265 as inputs to a machine learning algorithm to generate one or more training models. A wide variety of machine learning algorithms can be selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, and Maximum Information Spanning Trees (MIST).

The model trainer 265 evaluates the machine learning algorithm's prediction performance based on patterns in the received subset of features processed as training inputs and generates one or more new training models 270. The generated training models, e.g., trained prediction models 270, are then capable of receiving natural language inputs from outside of the machine learning process in which they were trained and generated to output natural language outputs as predicted domain-specific recommendations.

As further shown in FIG. 2A, the trained prediction models 275 that were generated as a result of performing the machine learning process, can receive natural language inputs and process the inputs to output predicted natural language outputs as domain-specific recommendations that can be optimized based on the natural language inputs and/or the domain-specific applications to which the inputs were provided. For example, the trained prediction models 275, that were produced in the machine learning process, can be subsequently be included in an artificial intelligence system or an application configured to receive natural language inputs as prediction inputs and process the data to output predicted natural language outputs as domain-specific recommendations in regard to a particular domain-specific objective being performed by a user, such as performing a search for domain-specific information or specification data or generating text associated with a domain-specific piece of equipment or image. In some embodiments, the processor 245 can store the predicted natural language outputs that were output from the trained prediction model 275 in memory 250. In other embodiments, the outputted natural language outputs can be forwarded to communications module 240 for transmission to the client 105 via network 235. Once received by the client 105, the outputted natural language outputs can be transmitted to output device 210, such as a monitor, printer, portable hard drive or other storage device.

Figure 2B:
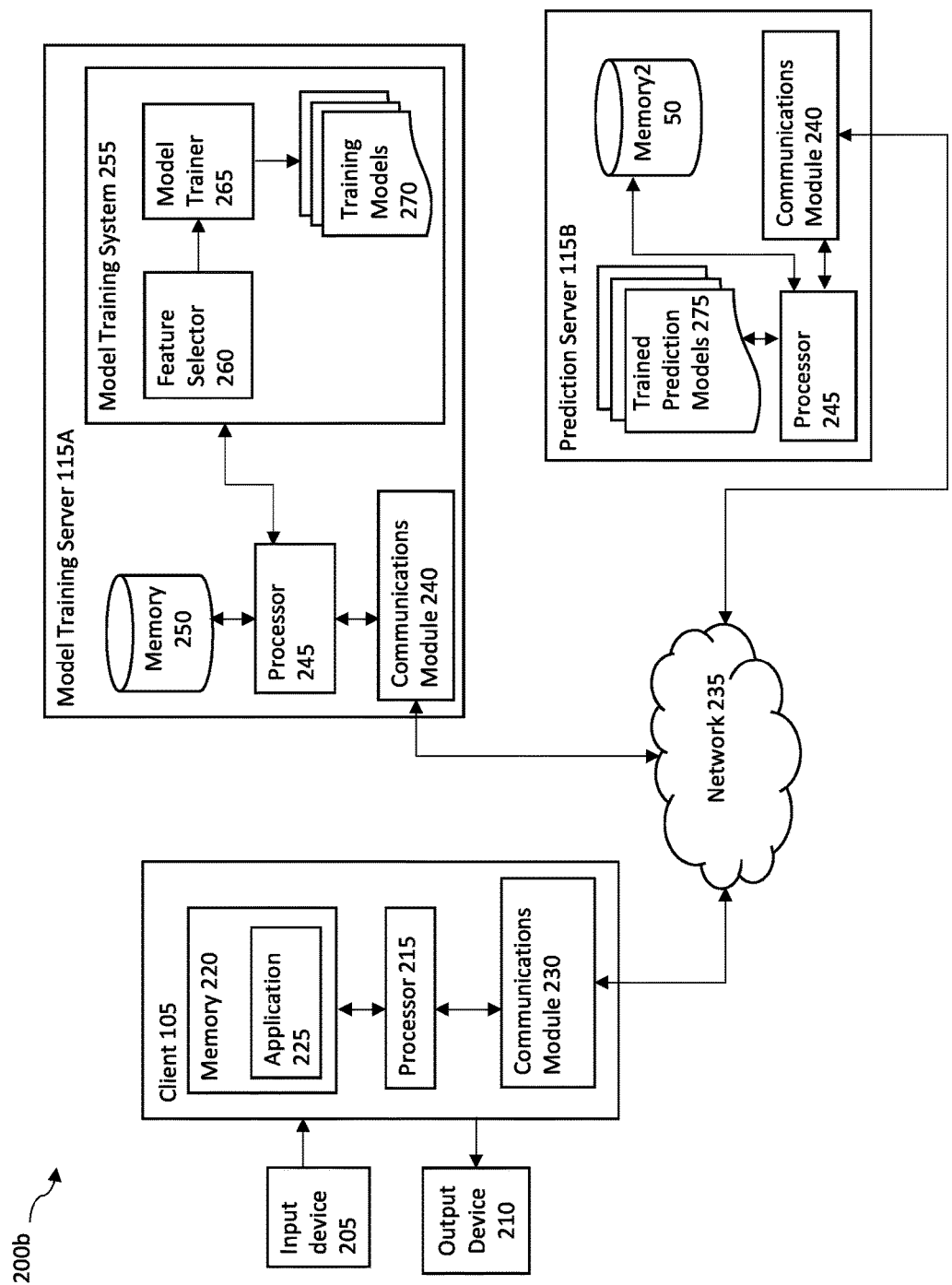

FIG. 2B illustrates an example block diagram of a system 200b using a machine learning process configured on a model training server 115A. The individual components and functionality of each component shown and described in relation to model training server 115A in FIG. 2B are identical to the components and respective functionality shown and described in relation to server 115 of FIG. 2A with the exception that the model training server 115A shown in FIG. 2B does not include one or more trained prediction models 275 as shown in FIG. 2A.

Instead, as shown in FIG. 2B, the system 200b includes a model training server 115A that is separate from the trained prediction models 275 that are now configured on the prediction server 115B. The prediction server 115B includes components and functionality similar to the server 115 shown in FIG. 2A with the exception that the prediction server 115B shown in FIG. 2B does not include a model training system, such as the model training system 255 shown in FIG. 2A. The prediction server 115B shown in FIG. 2B includes one or more trained prediction models 275. The trained prediction models 275 configured on the prediction server 115B are models or algorithms that were generated from a machine learning process, such as training models 270 and have been trained in the machine learning process to generate natural language outputs as predicted domain-specific recommendations based on natural language inputs provided to a domain-specific application. For example, upon receiving user data from a client, for example client 105, the trained prediction models 275 can be employed to generate one or more natural language outputs as domain-specific recommendations that are optimized based on the received natural language inputs and/or the domain-specific application to which the user provided the inputs. In some embodiments, each of the trained prediction models 275 can generate natural language outputs for a specific objective, user, input data type, or domain-specific application. In some embodiments, each of the trained prediction models 275 can generate a natural language output based on a specific input format such as a pattern or sequence of textual input present in the received inputs or an input including an image.

As shown in FIG. 2B, system 200b also includes a model training server 115A. The model training server 115A includes a model training system 255 which implements a machine learning process and includes a feature selector 260, a model trainer 265, and one or more training models 270. In some embodiments, the training server 115A can be located in the same location as prediction server 115B. In other embodiments, the model training server 115A can be located in a remote location, for example in a second data center that is separately located from the data center or client location where the prediction server 115B is located. In some embodiments, the model training system 255, configured on the model training server 115A, can be utilized to evaluate different machine learning algorithms and generate one or more alternate training models 275. For example, based on using different subsets of features in the received user data as the training inputs to a different machine learning algorithm and process, the model training system 255 can train and output a different training model 275 than the trained prediction models 275 configured on prediction server 115B which can have been trained using a separate machine learning algorithm and process.

The model training system 255 can also be configured with a machine learning process to train and output one or more training models 275 that are capable of generating natural language outputs based on historical natural language inputs which may have been provide by a user in the past and can be stored in memory 220 or memory 250. In some embodiments, the model training system 255 can generate a model, such as trained prediction model 275 which can be capable of generating natural language outputs when one or more of the natural language inputs which are traditionally used to determine a particular natural language output are not available. For example, a domain-specific recommendation including natural language outputs associated with a specific piece of equipment in the oil and gas domain can be optimized for a user's natural language inputs which may only partially identify the specific piece of equipment, for example by character sequences describing the model or serial number of the equipment as opposed to the formal, complete name of the equipment.

The model training system 255 can also be configured with a machine learning process to train and output multiple models, such as models 270 that have been trained in the machine learning process based on non-overlapping or partially overlapping sets of features. In some embodiments, the multiple models different sets of features can be implemented on the prediction server 115B to create a more robust system that includes an ensemble or collection of models. In such embodiments, the prediction server 115B can predict domain-specific recommendations including natural language outputs more accurately based on natural language inputs for different users, objectives, domain-specific applications, input data types, or other statistically correlated patterns observed in the received natural language inputs In this way, the model or ensemble of models can be trained to generate natural language outputs in situations when certain natural language inputs which are used in a given model may be missing or incomplete.

Figure 3:
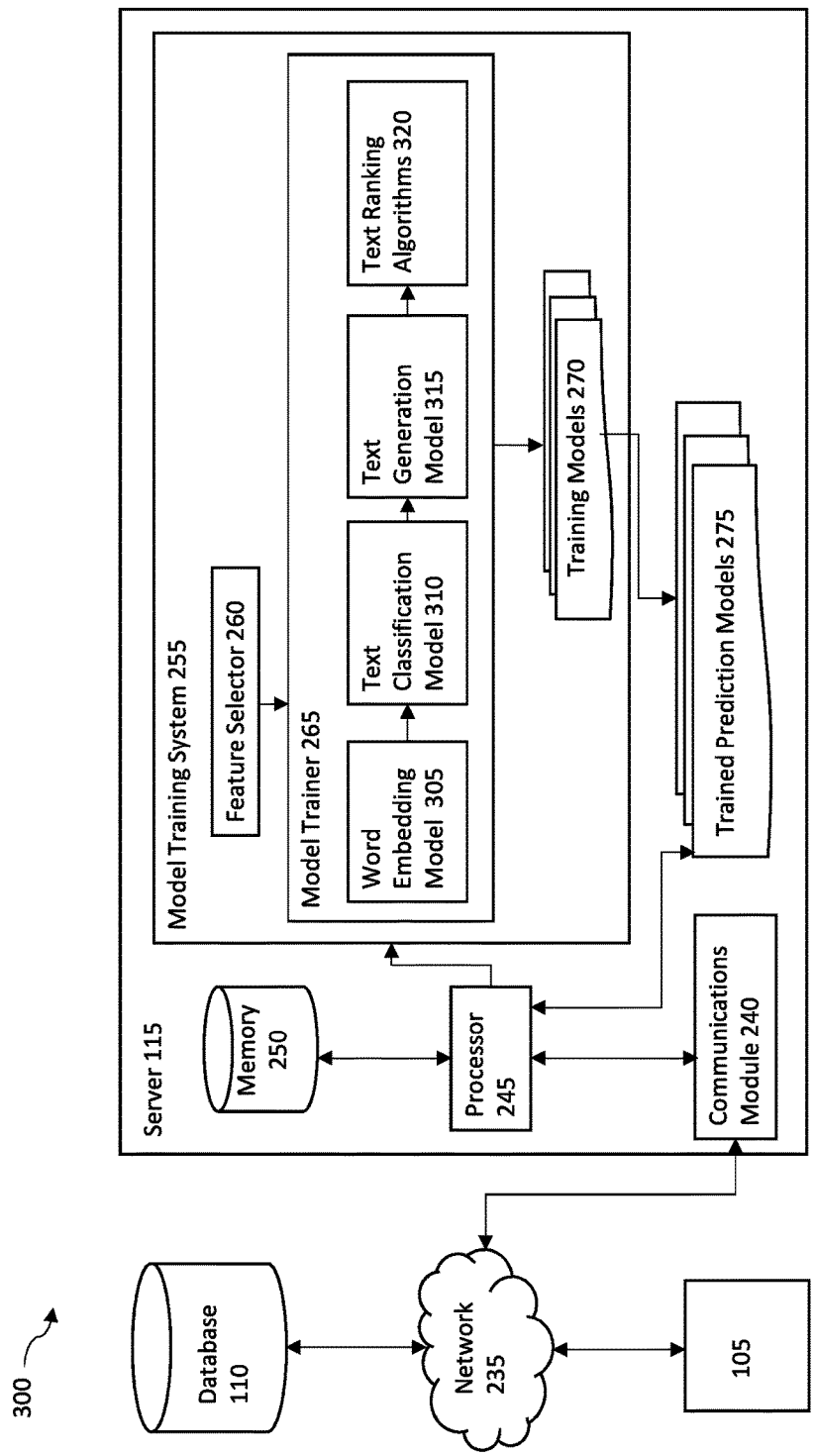
FIG. 3 a is a block diagram illustrating one exemplary embodiment of an architecture for training a model to generate natural language recommendations.

FIG. 3 is a block diagram illustrating the example client and server from the architecture of FIG. 1 in an exemplary training system 300. The block diagram of the training system 300 includes an example client 105 and server 115 similar to the client and server described in relation to architecture 100 of FIG. 1, the system 200a of FIG. 2A, and the system 200b of FIG. 2B, according to certain aspects of the disclosure.

As shown in FIG. 3, the client 105, the database 110, and the server 115 are connected over the network 235. The client 105 and the server 115 can be configured to exchange data that can be used to determine natural language outputs and domain-specific recommendations. Such data may include text, events, actions, images, event data, event message, input pattern data, requests, responses, and commands to other devices transmitted over the network. Additionally, the client 105 and the server 115 may share data stored in database 110 that can be used in the training system 300 in order to train a prediction model capable of generating domain-specific natural language outputs based on natural language inputs. The training input, stored in the database 110, can include domain-specific libraries containing documents, images, presentations, and product specification data. The database 110 can contain files whose contents can contain words and images that correspond to a particular industry or domain, such as the oil and gas domain. The database 110 can include documents, metadata, files, or the like that form an energy exploration lexicon that can used to form an industrial language model. In some embodiments, the database 110 can contain data associated with internal business communications conducted between members of an organization. In this way, the industrial language model can be trained to generate domain-specific language or "lingo" that may be commonly used by experts in the domain or industry.

The server 115 includes a communications module 240, a processor 245, and a memory 250 that includes one or more machine readable storage mediums containing program instructions for causing a computer to generate natural language outputs as domain-specific recommendations based on natural language inputs. The processor 245 of the server 115 is configured to execute instructions, such as instructions physically coded into the processor 245, instructions received from software in memory 250, or a combination of both. For example, the processor 245 of the server 115 can execute instructions to generate natural language outputs as domain-specific recommendations that may be output to a domain-specific application configured on client 105. Additionally, the processor 245 of the server 115 can execute instructions to execute a machine learning process configured to execute a model training system, such as model training system 255, configured to generate a trained prediction model 275 which can output domain-specific recommendations in natural language format based on natural language inputs.

As shown in FIG. 3, the server 115 also includes a model training system 255. The model training system 255 is configured in a machine learning process to train and generate prediction models which can be used to receive inputs and predict outputs. The training models 270 which can be generated, may then be deployed on the server 115 or a different server, such as the production server 115B of FIG. 2B and can be configured to receive natural language inputs from a variety of domain-specific applications. Based on the received inputs, the trained prediction models 275 can predict and generate outputs according to the methods and data sources utilized during a training phase of the machine learning process.

The model training system 255 includes a feature selector 260, a model training 265, and a plurality of training models 270. The model training system 255 outputs trained prediction models 275. The feature selector 260 receives the training data 120 from the client 105 and/or the database 110 via processor 245. The feature selector 260 can process the training data 120 into subsets of data so that downstream data processing and model training can optimize the resulting training models 270 as desired by the design of the machine learning process. For example, a model training system 255 can be configured to include a feature selector 260 that can process the training input data 120 into categories of documents, images, domain-specific text, non-domain-specific text, numerical data, or the like. For each selected subset of data, also known as features, which can be present in the training data 120, the selected machine learning algorithm can be trained to predict natural language outputs that may be associated with the subset of features for which the selected machine learning algorithm was trained.

As further shown in FIG. 3, the model training system 255 includes a model trainer 265. The model trainer 265 can include a variety of algorithms or mathematical models which can be used to generate a trained prediction model 275 that can output domain-specific recommendations including natural language content based on natural language inputs. For example, the model trainer 265 receives the subsets of features generated by the feature selector 260 and iteratively applies them to one or more previously selected machine learning algorithms to assess the performance of the algorithms and to learn patterns in the training input that correlate the variables of the machine learning algorithms to the target outputs. The output of this training process is a training model 270 which can then be deployed as a trained prediction model 275.

The model trainer 265 includes a plurality of models configured to determine a robust domain-specific lexicon as a recommendation when natural language inputs are received which contain minimal or no domain-specific content. For example, the model trainer 265 includes a word embedding model 305, a text classification model 310, a text generation model 315, and a text ranking algorithms 320.

The word embedding model 305, can include a domain-specific model that can map discrete words in the subsets of features to a continuous vector space. For example, the word embedding model 305 can convert words into numeric vectors. For example, if the embedding dimension is "5", the word "the" would be mapped to "[0.5, 0.9, 0.4, 0.8, 0.3]" and used as input to the model. The word embedding model 305 can be trained by a semi-supervised word to vector neural network. Such a neural network may be implemented using a skip-gram architecture. The model may be optimized in regard to domain-specific language or "lingo" so that the model can process and differentiate a word's meaning in a domain-specific context from meanings in a non-domain-specific context. For example, the word embedding model 305 can process "ESP" to correspond to have a meaning associated with an "electric submersible pump" rather than "extrasensory perception".

The model trainer 265 can further include a text classification model 310. The text classification model 310 can be used to classify a category or topic of a document or body of text. For example, the text classification model 310 can be configured to determine a document is a manual related to installing a pump or is a product safety data sheet for a specific chemical used a domain-specific process or workflow. To perform the classification, the text classification model 310 used an ensemble of deep learning models and further applies the domain specific word embedding model 305 to convert words into numeric vectors.

The model trainer 265 shown in FIG. 3 also includes a text generation model 315. The text generation model 315 can be used for multiple purposes in the training phase of the machine learning process. The text generation model 315 can be used to generate a trained prediction model 275 which can auto-generate reports or textual content based on an initial input of natural language. The resulting prediction model 275 can generate a full report or more complete textual content that includes domain-specific natural language as a result of training the model to learn the syntax and semantics of natural human language and its association with the domain-specific language that may be used within a particular industry. Additionally, in this way, the prediction model 275 can be trained to provide domain-specific natural language outputs when configured in an interactive agent, such as a chatbot program or a contextually aware recommendation agent. The text generation model 315 can include several component models that can be configured to interoperate with text generation model 315. For example, the text generation model 315 can also include a domain-specific language model and a domain-specific sequence-to-sequence model. In some embodiments, the sequence-to-sequence model can include an attention mechanism.

The model trainer 265 shown in FIG. 3, also includes one or more text ranking algorithms 320. The text ranking algorithms 320 can apply user preferences to recommend relevant documents, content, applications, products, images, or the like that may be suitable for the user based on the natural language inputs that can be received by the trained prediction model 275. The text ranking algorithms 320 can include an ensemble of tree-based algorithms such as CatBoost, LightGBM, XGBoost. The text ranking algorithms 320 can also include a deep feed-forward neural network, for example with entity embedding functionality, and can also include a collaborative filtering algorithm.

The combination of domain-specific implementations of the aforementioned training models within the model trainer 265 provides a novel machine learning process capable of generating a plurality of training models 270 which can be deployed individually as trained prediction models 275 outside of the model training system 255. The result of this unique training regimen is a trained prediction model 275 capable of receiving natural language inputs as prediction data and determining domain-specific language and content to be output as a recommendation to a user or as an annotation to an image.

The techniques described herein may further be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
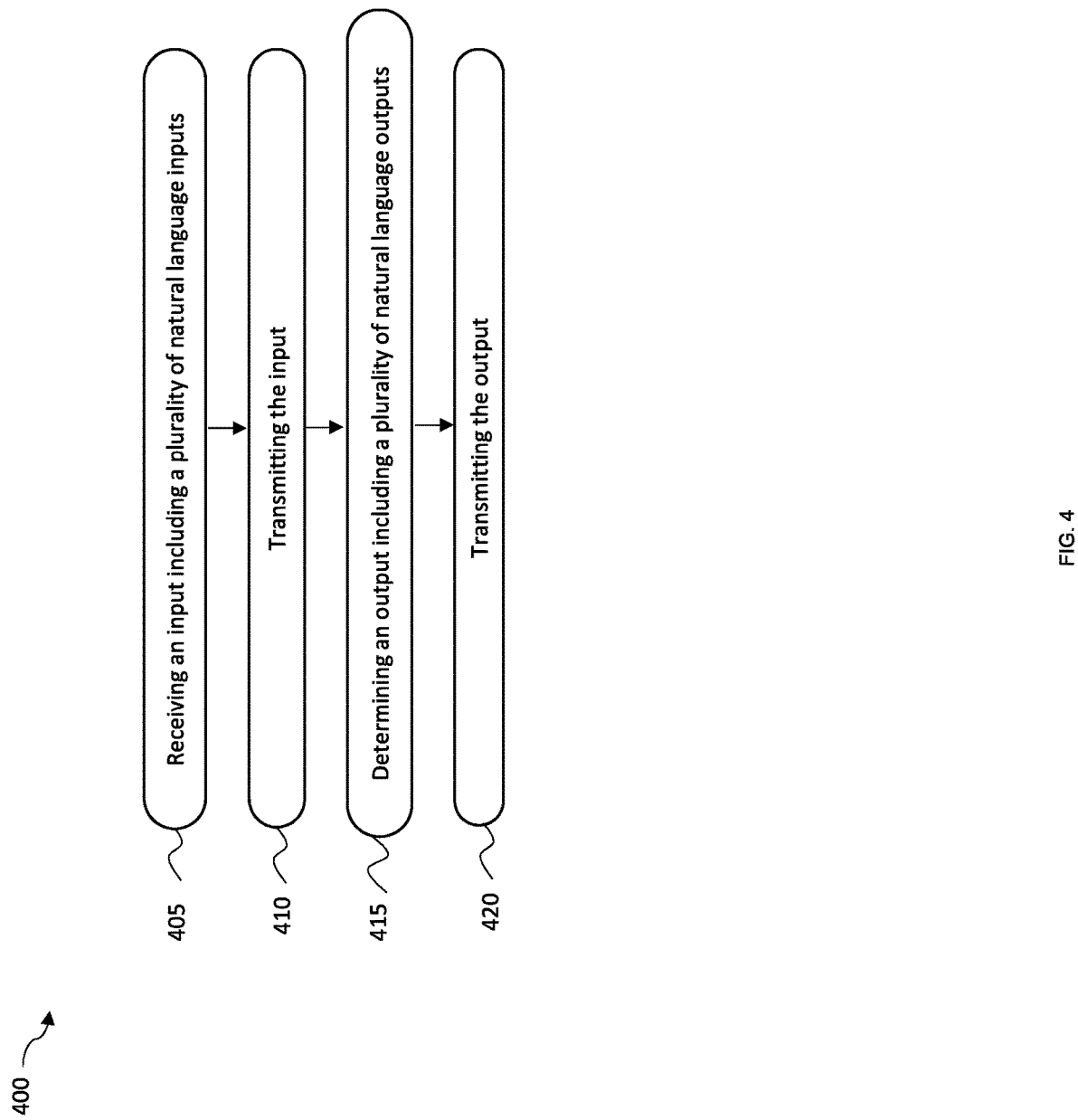
FIG. 4 is a flowchart illustrating one exemplary embodiment of a method for generating natural language recommendations based on an industrial language model using the client/server architecture of FIG. 1.

FIG. 4 is a flow diagram illustrating an exemplary embodiment of a method 400 for generating natural language outputs including domain-specific recommendations based on natural language inputs using the client/server of FIGS. 1, 2A, 2B and the trained prediction model 275 generated in a machine learning process using the training system 300, as shown and described in relation to FIG. 3. In certain aspects, embodiments of the method 400 can include greater or fewer operations than illustrated in FIG. 4 and the operations can be performed in a different order than illustrated in FIG. 4.

For example, in operation 405, a client 105 receives an input including a plurality of natural language inputs. For example, a client 105 can receive a search query input to a domain-specific search interface. The user can enter one or more natural language words describing the search terms. The input can also include numbers, symbols, and sequences of numbers and/or letters which may form whole inputs or may form portions of the users input. In some embodiments, the inputs can include images for which the user is attempting to describe, categorize or annotate in the context of domain-specific language.

In operation 410, the client 105 transmits the input to the server, such as server 115. During the training phase of a machine learning process, the client 105 and/or the database 110 can transmit the input, as training data 120 to the model training server 115A of FIG. 2B. During the prediction phase of the machine learning process, the client 105 and/or the database 110 can provide prediction data 125 to the prediction server 115B of FIG. 2B. The inputs can be transmitted from the client 105 and/or the database 110 to the server 115 via the network 235.

In operation 415, the server 115 determines an output including a plurality of natural language outputs. When the server 115 receives prediction data 125, the server 115 can apply the trained prediction model generated as a result of the training phase of the machine learning process to the transmitted inputs and can generate one or more natural language outputs that include domain-specific language and can be contextually correlated to inputs provided in a natural language format. The outputs can be determined as a result of the training approach employed during the training phase where by a number of domain-specific language processing models and techniques were applied to the training data 120 so that a deployable trained prediction model 275 can be generated. In some embodiments, the determined outputs can include outputs which require further input to cause execution of executable content which can be configured on the client 105 and/or the server 115. For example, the trained prediction model 275 can be trained to output a uniform resource locator (URL) or "web address" requiring a user to click or otherwise select the URL in a web-based environment to cause the computing device to navigate to the content stored at the URL location.

In operation 420, the server 115 transmits the outputs to the client 105 and/or the database 110 via the network 235. The client 105 can further provide the outputs to a user within the domain-specific application to which the user provided the natural language inputs. In some embodiments, the client 105 can receive the outputs and further transmit the outputs to the database 110 for storage, thereby reducing the amount of memory resources needed at client 105. In this way, the database 110 can include newly generated outputs that can be added to an energy exploration lexicon which may be stored in database 110. The client 105 can provide the outputs for display or, in some embodiments, the client 105 can generate a report, annotation, or similarly formatted collection of the natural language content that was output from the server 115 as a domain-specific recommendation.

The natural language outputs that are received by the clients 105 can be provided within the domain-specific applications 505-520 via one or more interfaces which can be displayed via outputs device 210. The displayed interfaces including the domain-specific natural language recommendations can represent an improved user interface for providing domain-specific recommendations in a natural language format about a domain-specific topic, piece of equipment, task, workflow or the like. The improved interface can include textual and graphical affordances to identify the natural language outputs or the corresponding domain-specific recommendations which can provide a user or electronically coupled computer with increased data comprehension, reduced processing time, and improved text generation and textual annotation in the domain-specific application. As a result, users and electronically coupled computers can receive natural language outputs, as domain-specific recommendations, which can improve the users understanding of domain-specific subject matter and improve the domain-specific accuracy of language that is used with a particular organization.

Figure 5:
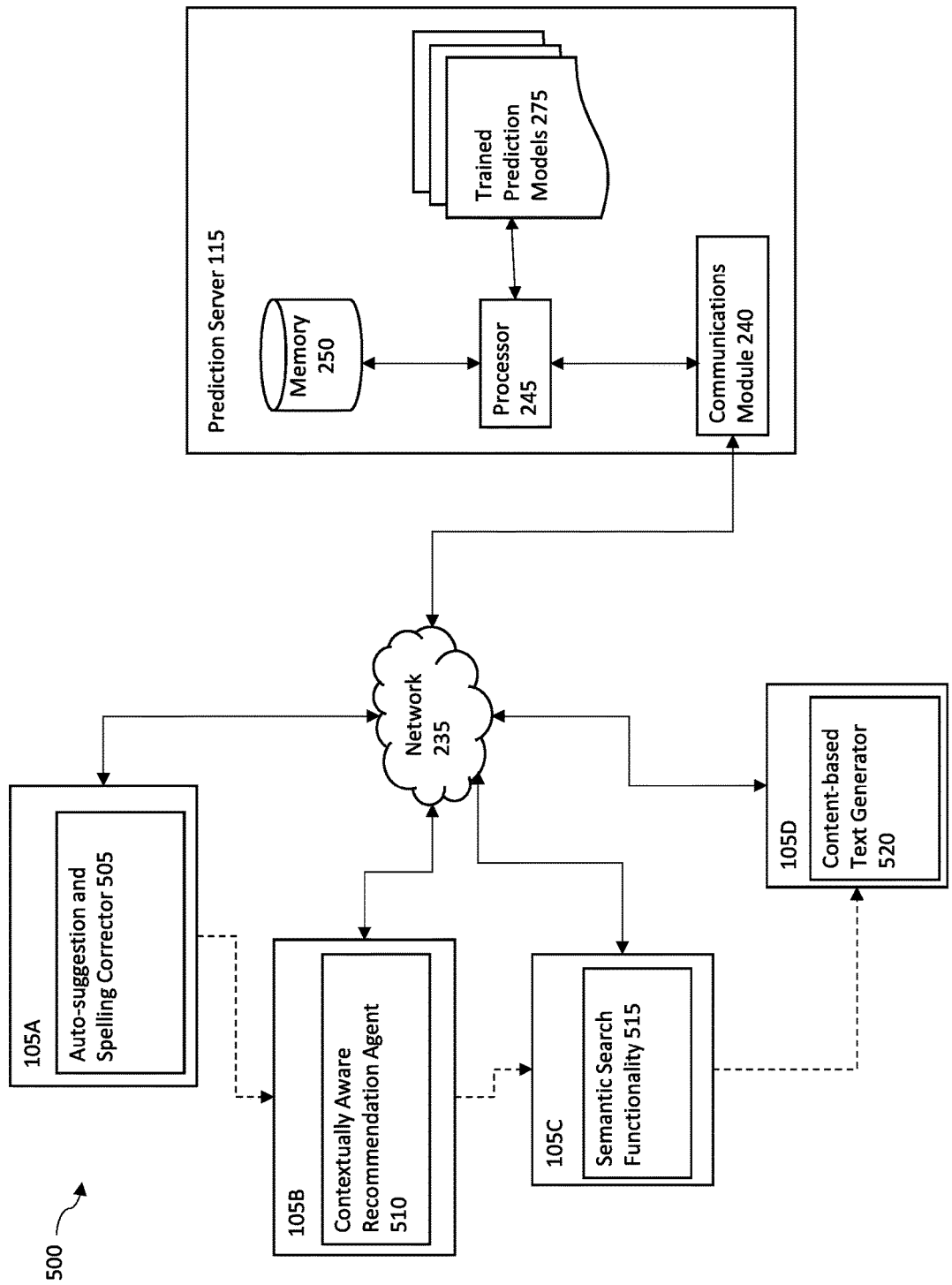
FIG. 5 is a block diagram illustrating an architecture for a system including an industrial language model trained to generate natural language recommendations in operation.

FIG. 5 is a block diagram illustrating an architecture 500 for a system including an industrial language model trained to generate domain-specific natural language recommendations in operation. The architecture 500 is similar to that shown and described in relation to FIG. 2B, except a plurality of clients 105 are shown in FIG. 5 to describe the different domain-specific applications or functionality associated with the domain-specific applications which may be configured within the architecture 500. The domain-specific applications may include functionality that corresponds to one or more of the training components configured within the model trainer 265 of FIG. 3 which may be utilized in the training phase of the machine learning process to generate the trained prediction models 275. As shown in FIG. 5, the architecture 500 includes clients 105A-105D communicating via network 235 with prediction server 115. Each of the clients 105A-105D are configured with a different domain-specific application to which a user may provide natural language inputs.

As shown in FIG. 5, client 105A is configured with an auto-suggestion and spelling corrector 505. The auto-suggestion and spelling corrector 505 can include domain-specific functionality that, when coupled to the prediction server 115, can automatically generate suggestions, help tips, pointers, typographical corrections, advice or the like. For example, when a user is entering a query into a search interface, the auto-suggestion and spelling corrector 505 can automatically provide suggestions or advice on correcting a typographical error. The suggestion will include a domain-specific recommendation including the natural language outputs that were determined by the prediction server 115 and are included in the domain-specific lexicon for which the trained prediction model 275 has been trained to generate outputs based on. For example, an input of "gammar" would be recognized by the prediction server 115 as a likely typographical error that should be replaced by a suggestion of "gamma board", representing a kind of data processor commonly used in the particular industry or domain for which the prediction model 275 has been trained and not "grammar", a suggestion with no domain-specific context or relevance with the input. Auto-suggestions can be implemented using a character-level language model with a search tree, such as a Trie prefix tree, while spelling corrections can be implemented using natural language processing techniques such as edit-distance techniques to determine candidate correction for a misspelled word by identifying words in a dictionary that have a low distance from the misspelled word.

As further shown in FIG. 5, client 105B is configured with a contextually aware recommendation agent 510. The contextually aware recommendation agent 510 can include an artificial conversational entity, such as an interactive agent, a chatbot program, or the like. A user can interact with the contextually aware recommendation agent 510 as if the user were communicating with a human. The contextually aware recommendation agent 510 can include programs and functionality which can simulate a human and can further be configured to generate natural language outputs received from prediction server 115 in response to the user's natural language inputs which are contextually related and domain-specific in regard to the inputs. Using the text ranking algorithms 320 described in relation to FIG. 3, the trained prediction model 275 can be trained to determine predictions for users in regard to the context of the inputs provided by the user and the actions taken by the user as a result of receiving the output via the contextually aware recommendation agent 510. In addition, the text generation model 315 of FIG. 3 can be employed to further train a prediction model 275 such that a contextually aware recommendation agent 510 providing inputs to the trained prediction model 275 would receive generated text including the domain-specific natural language outputs to provide back to the user via the contextually aware recommendation agent 510.

As shown in FIG. 5, client 105C includes a semantic search functionality 515. The semantic search functionality 515 can include an interface for a user to enter inputs as search terms with regard to a search objective. The trained prediction models 275 can receive inputs from the semantic search functionality 515 and determine the top ranked number of documents or content that may be most relevant to the context or domain-specific relevance of the query inputs. The trained prediction models 275 can be trained, in the training phase of the machine learning process using the word embedding model 305 and the domain-specific language model, to convert each query and any paragraphs of query content into fixed length vectors. Cosine similarity can be used to match query inputs and relevant paragraphs. Semantic search accuracy can also be enhanced using a model of term frequency-inverse document frequency statistics.

As shown in FIG. 5, client 105D includes a content-based text generator 520. The content-based text generator 520 can be configured to receive natural language inputs and to generate domain-specific content in a natural language format. The content-based text generator 520 can be used to generate sentences, paragraphs, partial or complete documents, such as reports or chatbot data, which include domain-specific natural language outputs. The trained prediction model 275 was trained in the training process using the text generation model 315 to determine natural language outputs that can include domain-specific content.

The improved recommendation system described herein addresses the technical problem of efficiently generating domain-specific recommendations in a natural language based on inputs which do not include sufficient domain-specificity. The problem of generating accurate, detailed, domain-specific content can be difficult and time-consuming, requiring significant computing resources to store multiple databases containing large libraries of domain-specific content which must be catalogued and indexed appropriately before being useful for generating domain-specific language or content. The exemplary technical effects of the methods, systems, and devices described herein include, by way of non-limiting example, generating domain-specific recommendations including natural language outputs using a predictive model trained in a machine learning process. The predictive model reduces the need for significant computing resources storing large databases of domain-specific content and provides the exemplary technical effect of reducing search times, improving search result generation, and improved domain-specific text generation. In addition, the precision and specificity of outputs provided by a contextually aware recommendation agent or chatbot, can be improved such that the agent or chatbot is able to more efficiently generate precise responses and specific feedback to a user that include domain-specific language. Thus the system represents an improvement of computer functionality that processes natural inputs and generates domain-specific natural language outputs. In this way, the improved recommendation system described herein can provide faster generation of more accurate domain-specific content in a multiple domain-specific applications or interfaces to provide domain-specific recommendations based on natural language inputs that may include a minimal amount of domain-specific data. Additionally, the domain-specific applications configured on the clients 105 which display the domain-specific recommendations can include an improved display or graphical user interface (GUI) that provides more efficient execution of domain-specific recommendations such as when performing auto-suggestion, spell checking, and conducting a chatbot interaction. Existing domain-specific applications typically do not include such robust interfaces to provide domain-specific recommendations generated by a trained prediction model. Existing domain-specific applications are limited to interfaces which may provide basic natural language recommendations but lack any domain-specificity in regard to the user inputs. The improved recommendation system provides a predictive, automatic, user-configurable system capable of generating domain-specific recommendations in a natural language format based on inputs that include minimal domain-specific data in the natural language inputs.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
receiving an input provided to a first computing device, including a data processor, the input describing a task performed within an oil and gas production environment and including a plurality of natural language input units and an image of a piece of machinery associated with the task;
transmitting the input to a second computing device including a data processor, the transmission performed by the first computing device over a network;
determining an output, by the second computing device, the output determined using the transmitted input and a predictive model trained to receive natural language input units and, in response to the receiving, generate an output corresponding to a lexicon of the oil and gas production environment, the output including a plurality of natural language output units predicted to correspond to the input and to the image, the plurality of natural language output units included in the lexicon; and
transmitting the output, by the second computing device, to the first computing device, the transmission causing the first computing device to provide the output for display.

2. The method of claim 1, further comprising a second predictive model, the second predictive model trained to determine a second output based on a second input, the second output including a different plurality of natural language output units.

3. The method of claim 1, wherein the plurality of natural language input units includes a word, a part of a word, a character, a sequence of characters, a number, or a sequence of numbers.

4. The method of claim 1, wherein the predictive model has been trained to determine a distribution of words in the input that corresponds to the lexicon based on receiving natural language input units as training input data to a word embedding model in a training phase of a machine learning process, the predictive model trained in the training phase of the machine learning process.

5. The method of claim 1, wherein the predictive model has been trained to classify the input into one or more categories associated with the lexicon based on receiving natural language input units as training input data to a text classification model in a training phase of a machine learning process, the predictive model trained in the training phase of the machine learning process.

6. The method of claim 1, wherein the predictive model has been trained to receive the input and automatically generate outputs as phrases and sentences including the plurality of natural language output units included in the lexicon based on receiving natural language input units as training input data to a text generation model in a training phase of a machine learning process, the predictive model trained in the training phase of the machine learning process.

7. The method of claim 6, wherein the predictive model has been trained to rank the automatically generated outputs based on user preferences using one or more text ranking algorithms in a training phase of a machine learning process, the predictive model trained in the training phase of the machine learning process.

8. The method of claim 1, wherein the first computing device includes a domain-based, auto-suggestion and spelling correction interface configured to receive the input and provide the output for display, the output determined based on a word embedding model and a language model.

9. The method of claim 1, wherein the first computing device includes a contextually aware recommendation agent configured to receive the input and provide the output for display, the output determined based on one or more text ranking algorithms.

10. The method of claim 1, wherein the first computing device includes a domain-specific, semantic search interface configured to receive the input and provide the output for display, the output determined based on a word embedding model and a language model.

11. The method of claim 1, wherein the first computing device includes a content-based text generation interface configured to receive the input and provide the output for display, the output determined based on a text generation model.

12. The method of claim 1, wherein the output includes one or more output units requiring further input to cause execution of executable content configured on the first and/or second computing devices.

13. A system comprising:
a first computing device, including a data processor and configured to receive and transmit an input describing a task performed within an oil and gas production environment; and
a second computing device coupled to the first computing device via a network, the second computing device including a processor and a memory storing computer-readable instructions and a plurality of prediction models, the processor configured to execute the computer-readable instructions, which when executed, cause the processor to perform operations including
receiving the input transmitted from the first computing device, the input including a plurality of natural language input units and an image of a piece of machinery associated with the task;
determining an output, the output determined using the transmitted input and a predictive model trained to receive natural language input units and, in response to the receiving, generate an output corresponding to a lexicon of the oil and gas production environment, the output including a plurality of natural language output units predicted to correspond to the input and to the image, the plurality of natural language output units included in the lexicon; and
transmitting the output to the first computing device, the transmission causing the first computing device to provide the output for display.

14. The system of claim 13, wherein the memory further comprises a second predictive model, the second predictive model trained to determine a second output based on a second input, the second output including a different plurality of natural language output units.

15. The system of claim 13, wherein the plurality of natural language input units includes a word, a part of a word, a character, a sequence of characters, a number, or a sequence of numbers.

16. The system of claim 13, wherein the predictive model has been trained to determine a distribution of words in the input that corresponds to the lexicon based on receiving natural language input units as training input data to a word embedding model in a training phase of a machine learning process, the predictive model trained in the training phase of the machine learning process.

17. The system of claim 13, wherein the predictive model has been trained to classify the input into one or more categories associated with the lexicon based on receiving natural language input units as training input data to a text classification model in a training phase of a machine learning process, the predictive model trained in the training phase of the machine learning process.

18. The system of claim 13, wherein the predictive model has been trained to receive the input and automatically generate outputs as phrases and sentences including the plurality of natural language output units included in the lexicon based on receiving natural language input units as training input data to a text generation model in a training phase of a machine learning process, the predictive model trained in the training phase of the machine learning process.

19. The system of claim 18, wherein the predictive model has been trained to rank the automatically generated outputs based on user preferences using one or more text ranking algorithms in a training phase of a machine learning process, the predictive model trained in the training phase of the machine learning process.

20. The system of claim 13, wherein the first computing device includes a domain-based, auto-suggestion and spelling correction interface configured to receive the input and provide the output for display, the output determined based on a word embedding model and a language model.

21. The system of claim 13, wherein the first computing device includes a contextually aware recommendation agent configured to receive the input and provide the output for display, the output determined based on one or more text ranking algorithms.

22. The system of claim 13, wherein the first computing device includes a domain-specific, semantic search interface configured to receive the input and provide the output for display, the output determined based on a word embedding model and a language model.

23. The system of claim 13, wherein the first computing device includes a content-based text generation interface configured to receive the input and provide the output for display, the output determined based on a text generation model.

24. The system of claim 13, wherein the output includes one or more output units requiring further input to cause execution of executable content configured on the first and/or second computing devices.

25. A non-transitory computer readable storage medium containing program instructions, which when executed by at least one data processor causes the at least one data processor to perform operations comprising:
receiving an input provided to a first computing device, including a data processor, the input describing a task performed within an oil and gas production environment and including a plurality of natural language input units and an image of a piece of machinery associated with the task;
transmitting the input, to a second computing device including a data processor, the transmission performed by the first computing device over a network;
determining an output, by the second computing device, the output determined using the transmitted input and a predictive model trained to receive natural language input units and, in response to the receiving, generate an output corresponding to a lexicon of the oil and gas production environment, the output including a plurality of natural language output units predicted to correspond to the input and to the image, the plurality of natural language output units included in the lexicon; and
transmitting the output, by the second computing device, to the first computing device, the transmission causing the first computing device to provide the output for display.

* * * * *